United States Patent
Havers

(10) Patent No.: US 10,624,267 B2
(45) Date of Patent: Apr. 21, 2020

(54) ROTARY CUTTER UNIT FOR AN AGRICULTURAL MOWER

(71) Applicant: Kverneland Group Kerteminde A/S, Kerteminde (DK)

(72) Inventor: Thomas Havers, Odense C (DK)

(73) Assignee: Kverneland Group Kerteminde A/S, Kerteminde (DK)

( * ) Notice: Subject to any disclaimer, the term of this patent is extended or adjusted under 35 U.S.C. 154(b) by 181 days.

(21) Appl. No.: 15/744,727

(22) PCT Filed: Jun. 17, 2016

(86) PCT No.: PCT/EP2016/064100
§ 371 (c)(1),
(2) Date: Jan. 12, 2018

(87) PCT Pub. No.: WO2017/012805
PCT Pub. Date: Jan. 26, 2017

(65) Prior Publication Data
US 2018/0206407 A1    Jul. 26, 2018

(51) Int. Cl.
*A01D 75/18* (2006.01)
*A01D 34/66* (2006.01)

(52) U.S. Cl.
CPC ......... *A01D 75/182* (2013.01); *A01D 34/664* (2013.01)

(58) Field of Classification Search
CPC .. A01D 34/664; A01D 75/182; A01D 34/665; A01D 34/66; A01D 34/76; A01D 34/828; F16D 9/06
See application file for complete search history.

(56) References Cited

U.S. PATENT DOCUMENTS 4,497,161 A * 2/1985 Vissers ............... A01D 34/828
                                                       56/13.6
4,693,061 A * 9/1987 Koch ................... A01D 34/664
                                                       56/13.6
(Continued)

FOREIGN PATENT DOCUMENTS

DE          19720956 A1    11/1998
DE    102007007242 A1 *  8/2008  .......... A01D 34/664
(Continued)

OTHER PUBLICATIONS

International Search Report and Written Opinion for Application No. PCT/EP2016/064100, dated Sep. 29, 2016.
(Continued)

*Primary Examiner* — Arpad Fabian-Kovacs
(74) *Attorney, Agent, or Firm* — Knobbe, Martens, Olson & Bear, LLP

(57) ABSTRACT

A rotary cutter unit (6) for an agricultural mower (2) comprises a housing (14) that carries a rotary bearing (18) having an axis of rotation (X), and a rotor assembly (20) that is supported by the bearing for rotation relative to the housing about the axis of rotation. The rotor assembly includes a shaft (24) that extends through the bearing, a drive input element (28) at an input end of the shaft for transmitting rotary drive to the shaft and a drive output element (32) at an output end (22) of the shaft to receive rotary drive from the shaft. A frangible element (40) comprising a weakened portion of the shaft (24) is provided between the drive input element and the drive output element, which is configured to break when subjected to an excessive load so as to interrupt the transmission of rotary drive between the drive input element and the drive output element. A retention mechanism (44) is provided, which prevents separation of the drive output element from the housing when the frangible element breaks but permits (Continued)

rotation of the drive output element relative to the housing. The retention mechanism includes a retention element (46, 48) that extends substantially radially between the drive output element (32) and the housing (14) to restrict axial movement between the drive output element and the housing.

20 Claims, 13 Drawing Sheets

(56) References Cited

U.S. PATENT DOCUMENTS

| | | | | |
|---|---|---|---|---|
| 4,720,964 | A * | 1/1988 | Ermacora | A01D 34/664 384/540 |
| 4,838,014 | A * | 6/1989 | Koch | A01D 34/664 56/13.6 |
| 4,999,981 | A | 3/1991 | Neuerburg | |
| 5,715,662 | A | 2/1998 | Walters | |
| 5,937,624 | A * | 8/1999 | McLean | A01D 34/665 56/13.6 |
| 6,675,563 | B1 | 1/2004 | Ehrhart et al. | |
| 6,718,745 | B1 * | 4/2004 | Adams | A01D 34/664 403/2 |
| 2002/0157366 | A1 | 10/2002 | Preipke et al. | |
| 2003/0136218 | A1 * | 7/2003 | Wohlford | A01D 34/664 74/606 R |
| 2009/0087257 | A1 | 4/2009 | Harkcom et al. | |
| 2009/0088260 | A1 * | 4/2009 | Harkcom | F16D 9/06 464/32 |
| 2011/0011049 | A1 * | 1/2011 | Van Der Ent | A01D 34/665 56/295 |
| 2017/0251598 | A1 * | 9/2017 | Stephenson | A01D 34/664 |

FOREIGN PATENT DOCUMENTS

| | | | | |
|---|---|---|---|---|
| EP | 0878120 | A2 * | 11/1998 | A01D 34/06 |
| EP | 1958493 | A1 | 8/2008 | |
| EP | 3120681 | B1 | 10/2017 | |

OTHER PUBLICATIONS

European Search Report for Application No. 15177479.1, dated Jan. 13, 2016.

* cited by examiner

ROTARY CUTTER UNIT FOR AN AGRICULTURAL MOWER

CROSS REFERENCE

This application is a U.S. National Phase of PCT International Application No. PCT/EP2016/064100, filed Jun. 17, 2016 and published as WO 2017/012805 on Jan. 26, 2017, which claims priority to U.K. Application No. 15177479.1, filed Jul. 20, 2015. The entire disclosure of each of the above-identified applications is hereby incorporated by reference.

BACKGROUND

Field

The present disclosure relates to a rotary cutter unit for an agricultural mower, a cutter bar for an agricultural mower, and an agricultural mower that includes a cutter bar. In particular, but not exclusively, the disclosure relates to a rotary disc cutter unit.

Certain Related Art

A known type of agricultural mower has a cutter bar that carries a plurality of rotary cutter units. Each rotary cutter unit includes a cutter disc comprising a disc-shaped knife holder that carries a number of knives, which project radially from the edge of the disc. The cutter bar includes a drive mechanism for driving the rotary cutter units so that the cutter discs rotate about their respective axes. The drive mechanism may include a set of intermeshed gears or alternatively it may include a drive shaft that drives each of the rotary cutter units through a pair of bevel gears.

SUMMARY

As mentioned above, this disclosure relates to a rotary cutter unit for an agricultural mower, a cutter bar for an agricultural mower, and an agricultural mower that includes a cutter bar. In particular, but not exclusively, the disclosure relates to a rotary disc cutter unit. Each rotary cutter unit can have a housing that is mounted on the cutter bar and a rotary shaft that is supported by the housing through a bearing. The shaft is connected at its lower end to a drive input element, for example a spur gear or a bevel gear, and the upper end of the shaft is connected to the knife holder to drive rotation of the knife holder.

In use, the cutter bar is mounted on a vehicle, for example a tractor, and extends perpendicular to the direction of travel. It may be mounted on the front or rear of the vehicle or to one side of the vehicle. The drive mechanism is driven, usually from the power take off of the vehicle, and the rotating cutter discs cut the standing agricultural crop as the vehicle advances.

If one of the rotating cutter discs hits an obstacle such as a rock, this can produce a very large transient load in the drive train, which can damage or destroy one or more of the gears. This can lead to an expensive repair and an extended idle time while the repair is carried out, possible resulting in loss of the crop.

To reduce the risk of damage to the drive train, the rotary cutter unit may include a frangible element that breaks when it is subjected to an excessive load. For example, U.S. Pat. No. 4,999,981 discloses a rotary cutter unit in which the shaft that transmits drive from the drive input gear to the cutter disc has a groove formed in its surface to provide a break zone that shears if it is subjected to an excessive torque. Therefore, if the cutter disc strikes a heavy obstacle, the shaft will shear to prevent the transient load being transmitted to the drive mechanism, thereby avoiding the risk of damage to the transmission mechanism. The rotary cutter unit is designed to be easily replaceable, so that a repair can be carried out quickly and easily in the field, with minimal delay to the mowing operation.

One problem with the disc cutter unit described in U.S. Pat. No. 4,999,981 is that when the shaft shears the rotating knife holder separates from the housing of the disc cutter and falls to the ground. Owing to the high kinetic energy of the rotating cutter disc it can then travel a distance of several metres, potentially causing damage to the mower, the vehicle or people or animals in the vicinity. The loose disc therefore represents a serious hazard.

US 2002/0157366 A describes a disc cutter head having a two-piece mounting hub connected by a shear bolt and a retention mechanism that acts between an outer hub and a drive shaft.

It is known to provide a retention mechanism that prevents axial separation of the knife holder from the housing when the frangible element breaks, but permits rotation of the drive output element relative to the housing. For example, EP1958493 describes a disc cutter in which the knife holder is connected to the shaft through a pair of radial shear pins, which shear if the cutter unit strikes an obstacle. A retaining ring is provided at the upper end of the drive shaft to prevent the knife holder separating from the shaft. This solution avoids the problems associated with a loose disc, but the use of shear pins instead of a shaft with a break zone leads to increased manufacturing and assembly costs, and in general the protection provided by the shear pin mechanism is not as reliable as that provided by a shaft that has a break zone.

It is an object of some embodiments of the present disclosure to provide a rotary cutter unit that mitigates one or more of the problems associated with existing rotary cutter units.

According to an embodiment of the present disclosure there is provided a rotary cutter unit for an agricultural mower, comprising a housing that carries a rotary bearing having an axis of rotation, and a rotor assembly that is supported by the bearing for rotation relative to the housing about the axis of rotation, wherein the rotor assembly includes a shaft that extends through the bearing, a drive input element attached to an input end of the shaft for transmitting rotary drive to the shaft, a drive output element attached to an output end of the shaft to receive rotary drive from the shaft, a frangible element comprising a weakened portion of the shaft between the drive input element and the drive output element, which is configured to break when subjected to an excessive load so as to interrupt the transmission of rotary drive between the drive input element and the drive output element, and a retention mechanism that prevents separation of the drive output element from the housing when the frangible element breaks, but permits rotation of the drive output element relative to the housing; characterised in that the retention mechanism includes a retention element that extends substantially radially between the drive output element and the housing to restrict axial movement between the drive output element and the housing.

The rotary cutter unit includes a frangible element comprising a weakened portion of the shaft between the drive input element and the drive output element, which is configured to break when subjected to an excessive load so as to interrupt the transmission of rotary drive between the drive input element and the drive output element. This prevents damage to the drive mechanism driving the rotary cutter unit (for example, a train of gears in the cutter bar) in event that the rotary cutter unit strikes an obstacle. In that case, instead of transmitting the transient load to the drive train and potentially damaging the drive train, the frangible element breaks, thereby interrupting the transmission of rotary drive between the drive input element and the drive output element. The weakened portion of the shaft may for example be provided by forming a circumferential groove or slot in the surface of the shaft.

After the frangible element has broken the retention mechanism prevents the drive output element separating from the housing, thereby preventing the rotating disc from escaping and running loose and avoiding the dangers associated with a loose disc.

The rotary cutter unit is designed to be easy and quick to replace, allowing a damaged unit to be removed and replaced quickly in the field without any specialised equipment. The mowing operation can thus be interrupted for only a minimal period. The mechanism of the rotary cutter unit is simple and reliable and does not affect normal operation of the mowing machine. The rotary cutter unit is also relatively inexpensive to manufacture and assemble.

In an embodiment, the retention mechanism includes an outwardly extending radial flange on the housing and at least one inwardly extending retention element on the drive output element that engages the radial flange to prevent axial separation of the drive output element from the housing.

In an embodiment, the housing includes a sleeve element that extends axially around a portion of the drive shaft, and the radial flange is provided towards one end of the sleeve, adjacent the drive output element.

The drive output element may include a plurality of inwardly extending claws that engage the radial flange. The radial flange may include a plurality of openings through which the claws can pass to permit axial displacement of the drive output element relative to the housing. This allows the rotary cutter unit to be assembled or disassembled, the claws being passed through the openings in a direction parallel to the rotational axis. The openings are preferably only marginally larger than the claws, so that the claws can pass through the openings only when they are accurately aligned. This prevents the drive output element separating from the housing while it is rotating, or when the claws are not accurately aligned with the openings. Optionally, the claws and the respective openings may have different dimensions, so that the drive output element can be separated from the housing in a single unique orientation.

In another embodiment, the drive output element includes a plurality of detachable retaining elements that engage the radial flange. In this embodiment there is no need for openings in the flange, as the retaining elements can be detached to allow the rotary cutter unit to be assembled or disassembled.

The detachable retaining elements may comprise brackets that are removably attached to the drive output element, each bracket including an inwardly extending retention element that engages the radial flange. The brackets may be attached to the drive output element in numerous different ways, for example using bolts or a snap-fit fixing. As previously described, the retaining elements can be detached to allow the rotary cutter unit to be assembled or disassembled.

Alternatively, the detachable retaining elements may comprise a plurality of ring components that are removably attached to the drive output element to form an inwardly extending ring that engages the radial flange. This embodiment provides the advantage that there is a reduced risk of plant material or other detritus getting caught on the retaining elements, as they form a complete ring with no separate protrusions.

Alternatively, the detachable retaining elements may comprise a plurality of fasteners that are inserted through radial holes in the drive output element and extend radially inwards to engage the radial flange. The drive output element may for example include a sleeve that extends towards the housing, through which the detachable retaining elements can be inserted. The detachable retaining elements may for example comprise bolts, screws or pins that are inserted through holes in the sleeve.

In another embodiment, the inwardly extending retention element comprises a circlip that is located in an inwards-facing slot in the drive output element and engages the radial flange to prevent axial separation of the drive output element from the housing. This provides a very simple and efficient retention mechanism.

In another embodiment, the retention mechanism includes an outwardly extending retention element on the housing that engages the drive output element to prevent axial separation of the drive output element from the housing when the frangible element breaks.

The outwardly extending retention element may comprise a circlip that is located in an outwards-facing slot in the housing and engages an inwards-facing slot in the drive output element. Again, this provides a very simple and efficient retention mechanism. The mechanism has the advantage that it may be configured to prevent disassembly of the rotary cutter unit by an end user who does not have the specialised tools required to remove the circlip. The rotary cutter unit is therefore tamper-proof.

Optionally, the housing includes an inner sleeve element that extends around a portion of the drive shaft, and the drive output element includes an outer sleeve element that overlaps a portion of the inner sleeve element, wherein the circlip engages the overlapping portions of the inner and outer sleeve elements. Optionally, the sleeve elements may be configured so that the rotary cutter unit can be assembled without requiring tools: for example by means of a snap-fit connection. This can be achieved, for example, by providing a chamfer on the end face of the outer sleeve element, which compresses the circlip inwards as the drive output element is urged towards the housing, allowing the parts to be locked together by the circlip. Optionally, the drive input element comprises a gear, for example a spur gear or a bevel gear. Optionally, the drive output element comprises or is attached to a rotary cutter assembly that includes a plurality of cutter knives, for example a cutter disc.

According to another embodiment of the present disclosure there is provided a cutter bar for an agricultural mower, comprising a support structure, a plurality of rotary cutter units according to any one of the preceding statements of the disclosure, each rotary cutter unit being mounted on the support structure, and a drive mechanism that drives the drive input element of each rotary cutter unit.

Optionally, the support structure comprises an enclosed carrying beam, wherein the drive mechanism is housed within the enclosed carrying beam, and wherein the housing of each rotary cutter unit is mounted on the carrying beam such that the shaft extends through an aperture in the carrying beam, the drive input element of each rotary cutter unit is located internally of the carrying beam in engagement with the drive mechanism, and the drive output element of each rotary cutter unit is located externally of the carrying beam.

According to an embodiment of the present disclosure there is provided an agricultural mower including a cutter bar according to any one of the preceding statements of the disclosure, and a vehicle that supports the cutter bar.

BRIEF DESCRIPTION OF THE DRAWINGS

Certain embodiments of the disclosure will now be described, by way of example, with reference to the accompanying drawings, in which.

DETAILED DESCRIPTION

Figure 1:
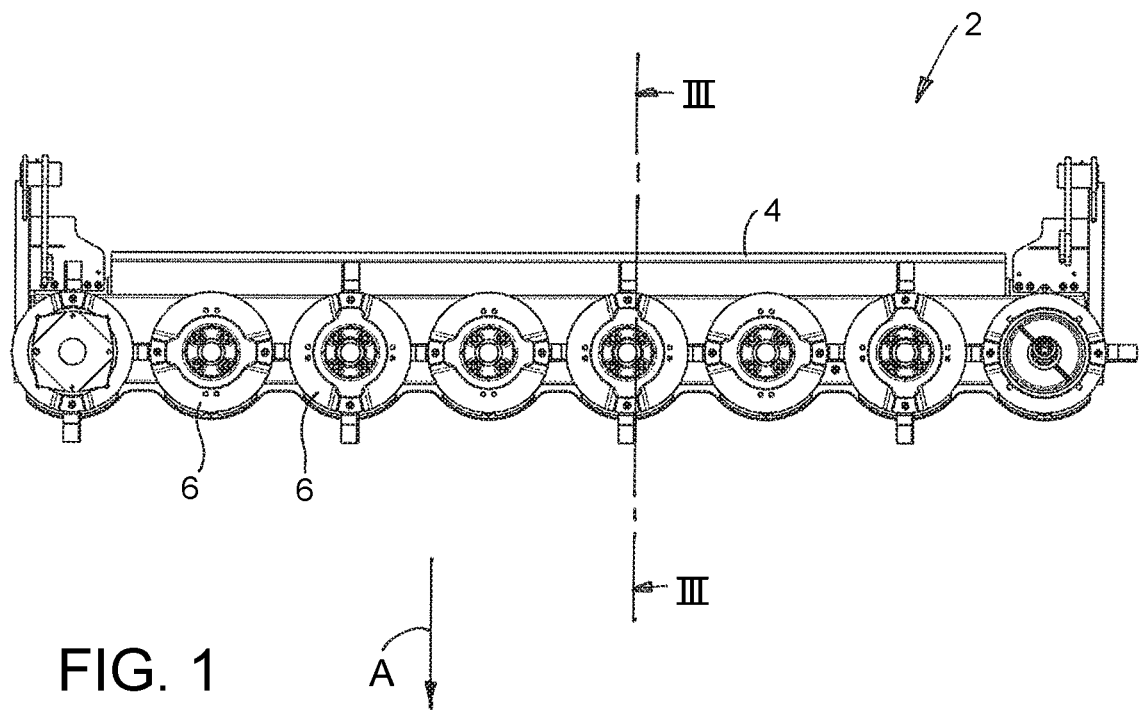
FIG. 1 is a top plan view of a cutter bar that includes a plurality of first rotary cutter units, according to a first embodiment of the disclosure.
Figure 2:
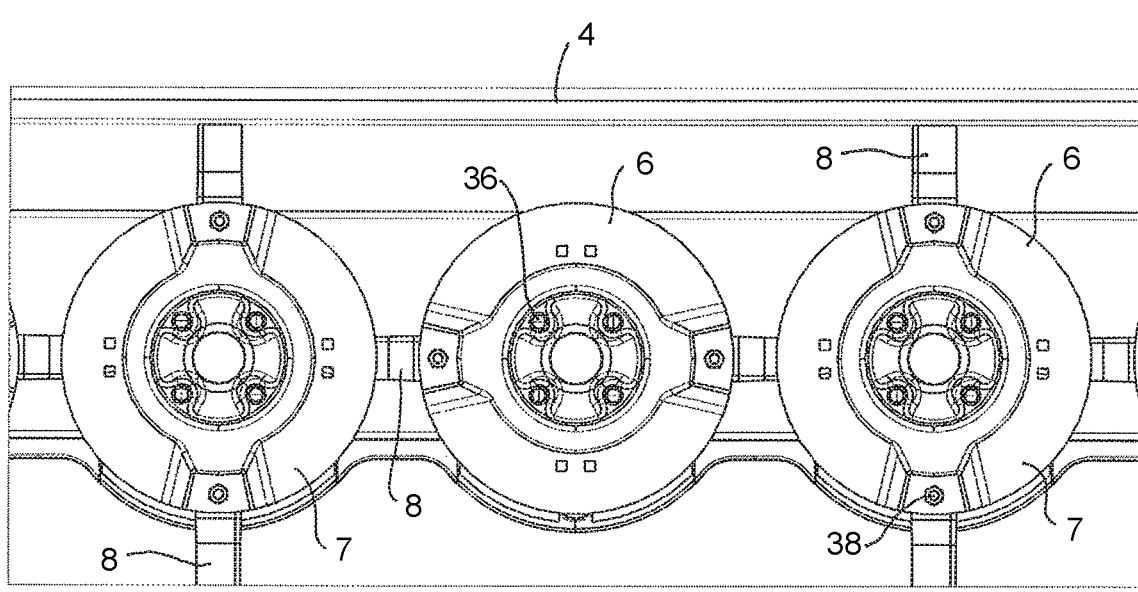
FIG. 2 is a top plan view showing part of the cutter bar of FIG. 1 at an enlarged scale.
Figure 3:
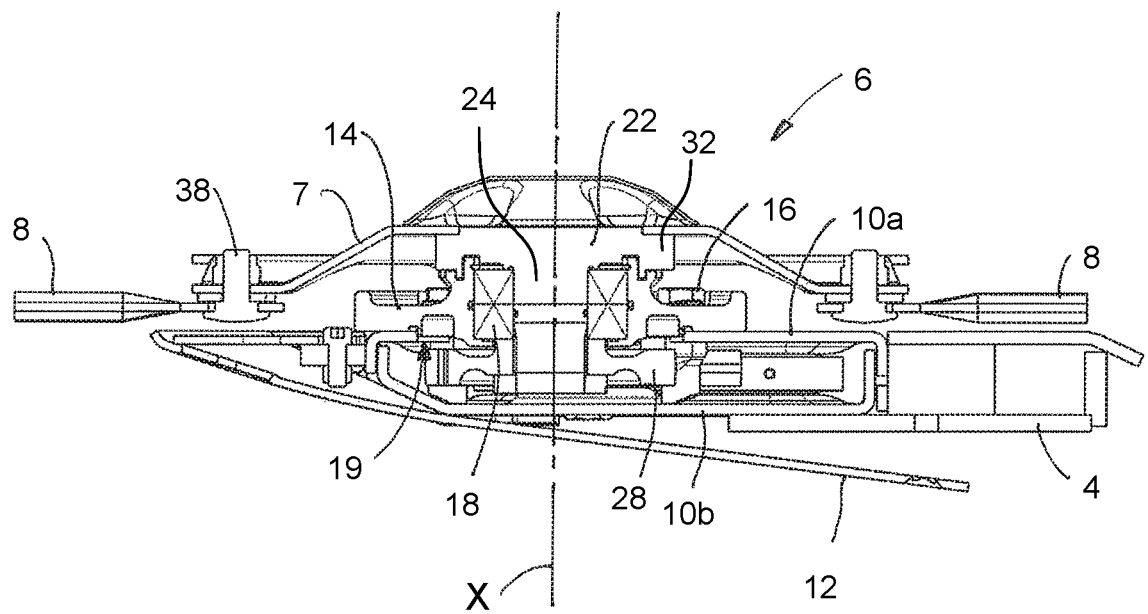
FIG. 3 is a cross-sectional view on line III-III of FIG. 1, showing the cutter bar and a first rotary cutter unit.
Figure 4:
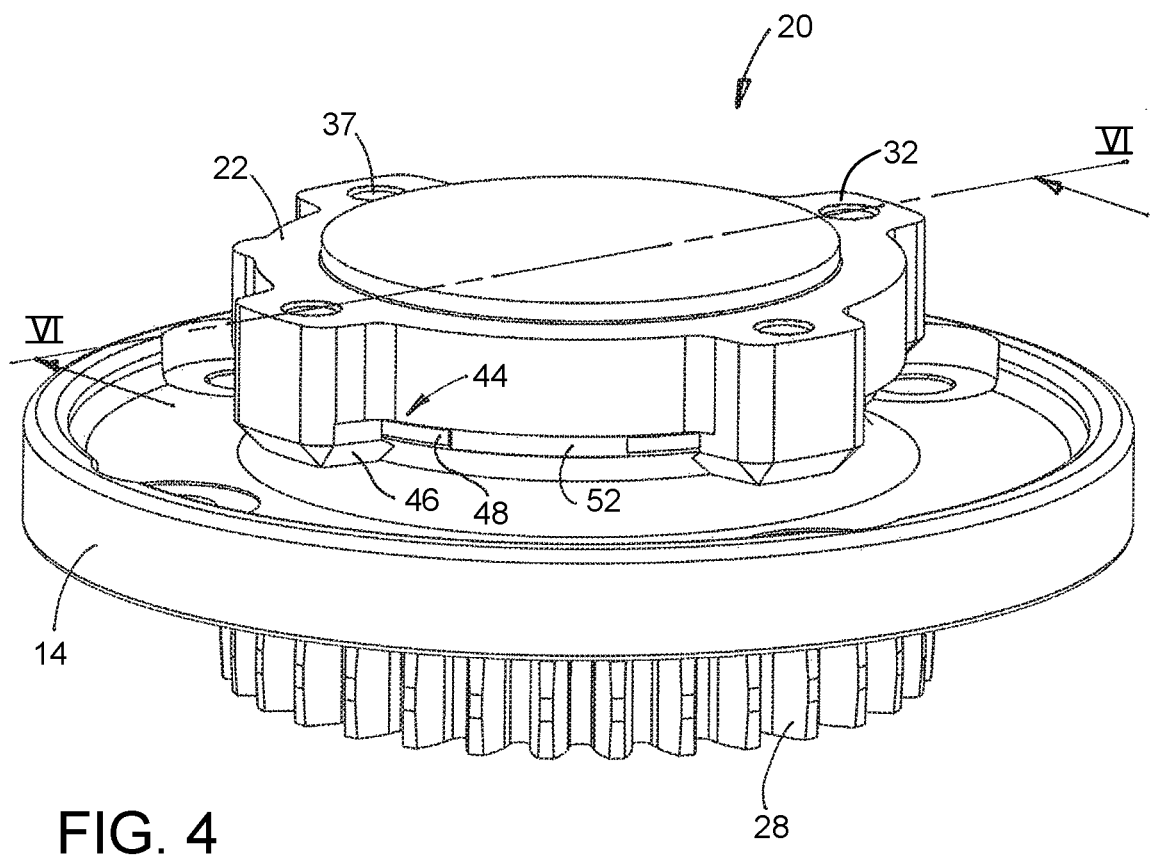
FIG. 4 is an isometric view of a housing and rotor assembly that forms part of the first rotary cutter unit, in a locked configuration.
Figure 5:
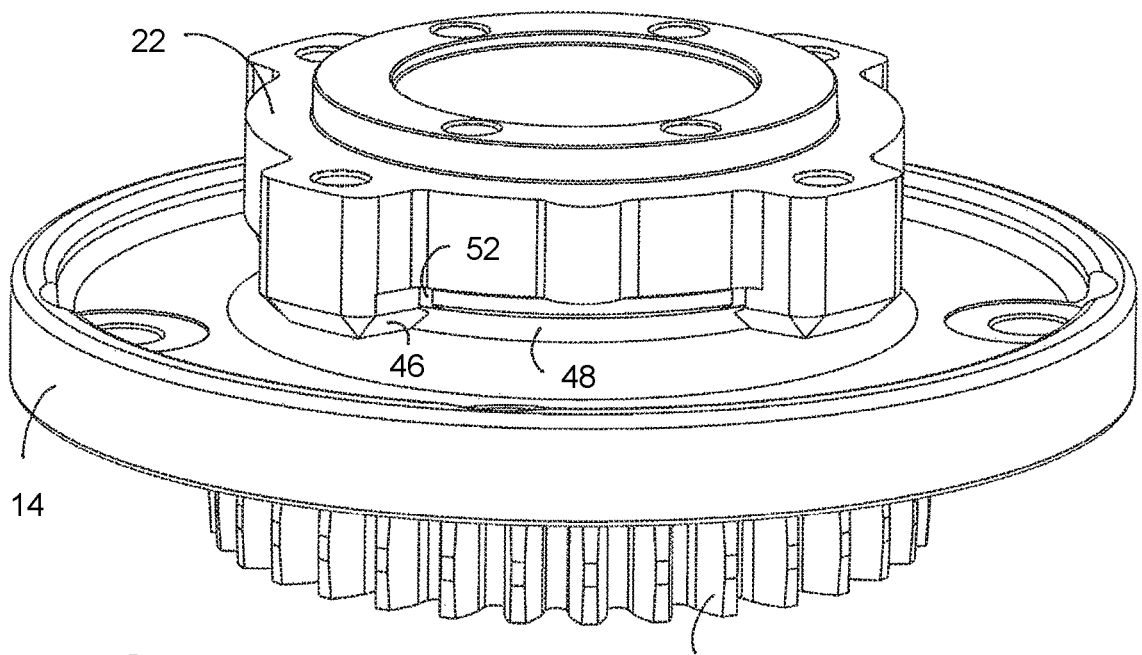
FIG. 5 is an isometric view of the housing and rotor assembly in an unlocked configuration.
Figure 6:
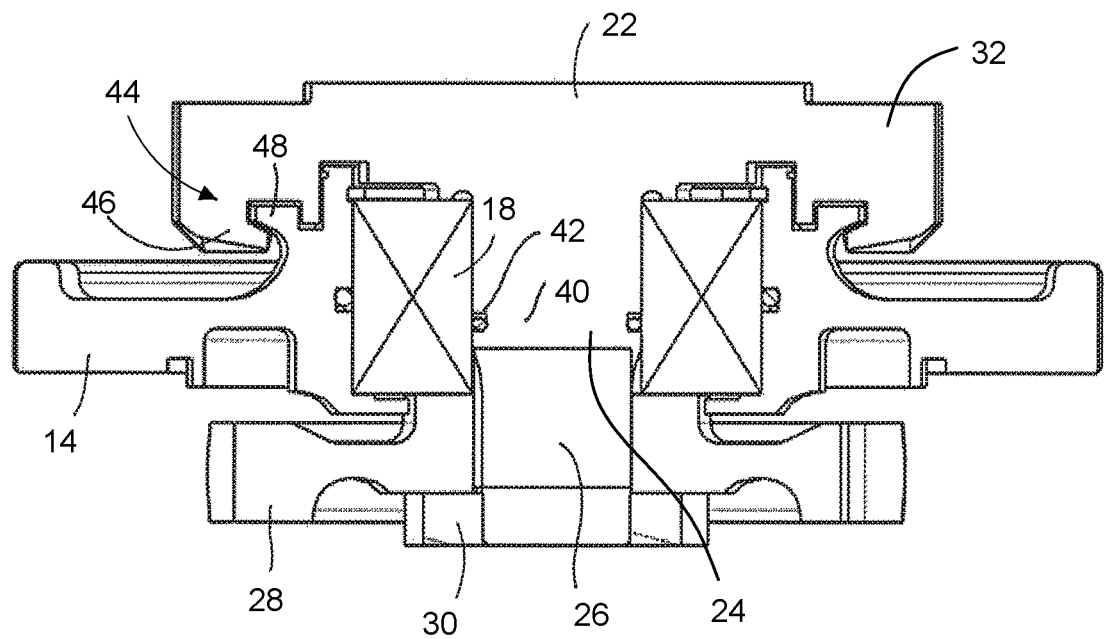
FIG. 6 is a cross-section on line VI-VI of FIG. 4, showing a retention mechanism in the locked configuration.

FIGS. 1 to 3 illustrate a cutter bar for an agricultural mower. Certain parts of the cutter bar may, for example, be similar to the corresponding parts of the mower described in U.S. Pat. No. 4,999,981. The various embodiments of the disclosure described below and shown in the accompanying drawings may each include a cutter bar substantially as shown in FIGS. 1 to 3, but incorporating the modifications as described below.

The mower unit 2 includes an elongate cutter bar 4 and a plurality of rotary cutter units 6 that are mounted on the cutter bar 4. The cutter bar 4 houses a drive mechanism for driving the rotary cutter units 6, and each rotary cutter unit 6 carries a rotating cutter disc 7 that has on its periphery one or more knives 8 that rotate with the cutter disc 7. In use, the mower unit 2 travels in a travel direction as indicated by arrow A and the rotary cutter units 6 cut a standing agricultural crop as the mower advances.

The structure of a first rotary cutter unit 6 according to a first embodiment of the disclosure is illustrated in FIG. 3. Other rotary cutter units forming alternative embodiments of the disclosure are described below and are illustrated in the accompanying drawings: these alternative designs are all variants of the first rotary cutter unit and, except where indicated otherwise, include similar features.

The rotary cutter units 6 are carried by the cutter bar 4. As illustrated in FIG. 3, the cutter bar 4 consists of an enclosed housing comprising a top plate 10a and a bottom plate 10b. The cutter bar 4 houses a drive mechanism for driving the rotary cutter units 6, which may consist either of a train of gears, for example as described in U.S. Pat. No. 5,715,662, or a drive shaft and a set of transfer gears, for example as described in U.S. Pat. No. 6,675,563. A skid 12 is attached to and extends rearwards beneath the cutter bar 4.

Each rotary cutter unit 6 includes a housing 14 that is attached to the top plate 10a of the cutter bar 4, for example with bolts 16. The housing 14 has a sleeve portion 14a with a bore 14c that supports a rotary bearing 18, and a flange portion 14b that extends radially outwards from the lower end of the sleeve 14a and lies against the upper surface of the cutter bar top plate 10a. An O-ring 15 may be provided in a slot 17 in the inner surface of the bore 14c, to provide a seal between the sleeve portion 14a and the bearing 18. The flange portion 14b covers a hole 19 in the top plate 10a, through which the lower parts of the rotary cutter unit 6 extend.

Each rotary cutter unit 6 includes a rotor assembly 20 that is supported by the bearing 18 and is mounted for rotation about the rotary axis X of the bearing 18. The rotor assembly 20 includes a hub element 22 having a shaft 24 that is supported by the bearing 18. The lower part of the shaft 24 carries a set of splines 26 that engage a cylindrical or plain gear 28, which is mounted on the lower part of the shaft. The gear 28 is retained by a nut 30 that engages a screw thread provided on the lower end of the shaft 24. The gear 28 comprises a drive input element that transmits rotary drive to the shaft from the drive mechanism contained within the cutter bar 4.

The hub element 22 also includes a flange 32 at the upper end of the shaft 24, which extends radially outwards from the shaft. The flange 32 comprises a drive output element for transmitting rotary drive from the hub element 22 to the cutter disc 7, which is attached to the flange 32 for example by bolts 36, received in threaded holes 37. The cutter disc 7 comprises a knife holder that carries the knives 8, which are attached to the periphery of the cutter disc 7 by knife bolts 38. The knives 8 are able to rotate about the axes of the knife bolts 38, allowing them to absorb impacts with small obstacles. In use, the centrifugal force acting on the rotating knives 8 causes them to extend radially outwards from the periphery of the cutter disc 7.

The shaft 24 includes a frangible element 40, which allows the shaft to break when it is subjected to an excessive torque. The frangible element 40 may, for example, be created by forming a groove or slot 42 in the surface of the shaft to form a weakened portion the shaft. The frangible element 40 is designed to protect the drive gear 28 and the drive mechanism housed within the cutter bar 4 in the event that the rotating cutter disc 7 strikes a large obstacle, which prevents or restricts continued rotation of the rotary cutter unit. If this happens, the frangible element 40 is designed to shear, thus breaking the shaft 24 into two separate parts and preventing the transmission of torque between the drive input element (gear 28) and the drive output element (the hub flange 32). This prevents large impulse forces being transmitted to the drive mechanism and so protects the drive mechanism from damage.

The rotary cutter unit 6 also includes a retention mechanism 44 that prevents separation of the drive output element (the hub flange 32) and the cutter disc 7 from the housing 14 in the event that the frangible element 40 breaks. The retention mechanism 44 is shown most clearly in FIGS. 4 to 10.

In the first embodiment of the disclosure the retention mechanism 44 includes a set of retention claws 46 that depend from the lower end of the hub flange 32 and extend radially inwards towards the rotational axis X of the bearing 18. The retention mechanism 44 also includes a retention flange 48 that extends radially outwards from the upper end of the housing sleeve 14a. The retention claws 46 are located beneath the retention flange 48 and extend radially inwards beyond the outer periphery of the retention flange 48, thus preventing axial separation of the drive output element 32 from the housing 14. A small gap 50 is provided between the claws 46 and the flange 48 so that rotation of the hub element 22 relative to the housing 14 is not impeded prior to breakage of the frangible element 40.

In this embodiment four retention claws 46 are provided, which are spaced equidistantly from each other. It should be understood however that more or fewer retention claws may alternatively be provided.

In order to allow for assembly and disassembly of the rotary cutter unit 6, the retention flange 48 includes a plurality of cut-out portions 52, each of which is formed by cutting away the radially outer part of the flange 48 to provide a recess through which a retaining claw 46 can pass. The number and the spacing of the cut-out portions 52 are matched to the number and the spacing of the claws 46, each cut-out portion 52 being only fractionally larger than the corresponding claw 46, so that the claw 46 can pass through the cut-out portion 52 only when both are accurately aligned. The hub flange 32 that carries the claws must also be stationary relative to the housing 14: if there is any relative rotation between the hub flange 32 and the housing 14 it will be impossible for the retaining claws 46 to pass through the cut-out portions 52. This prevents axial separation of the hub element 22 from the housing 18, except when the hub element is stationary (not rotating) and is positioned so that the retaining claws 46 are aligned with the cut-out portions 52.

Figure 8:
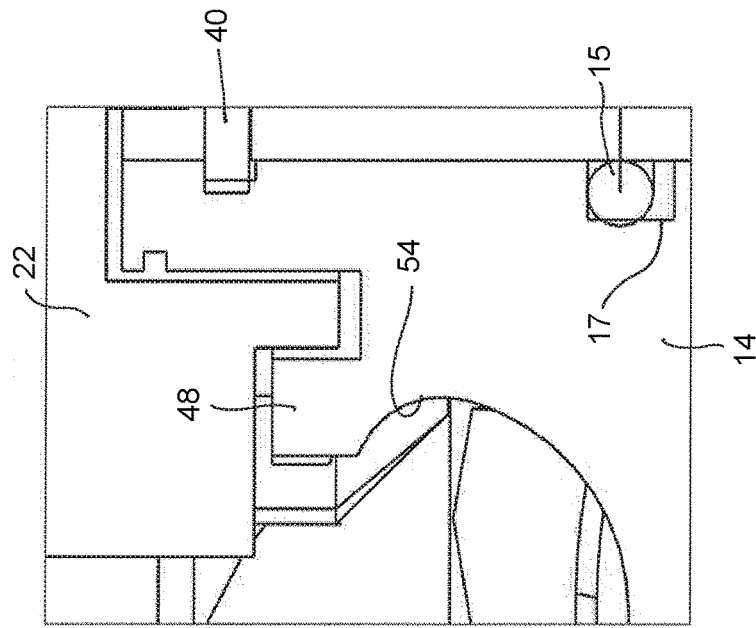
FIG. 8 is an enlarged cross-section showing part of the retention mechanism in the unlocked configuration.
Figure 9:
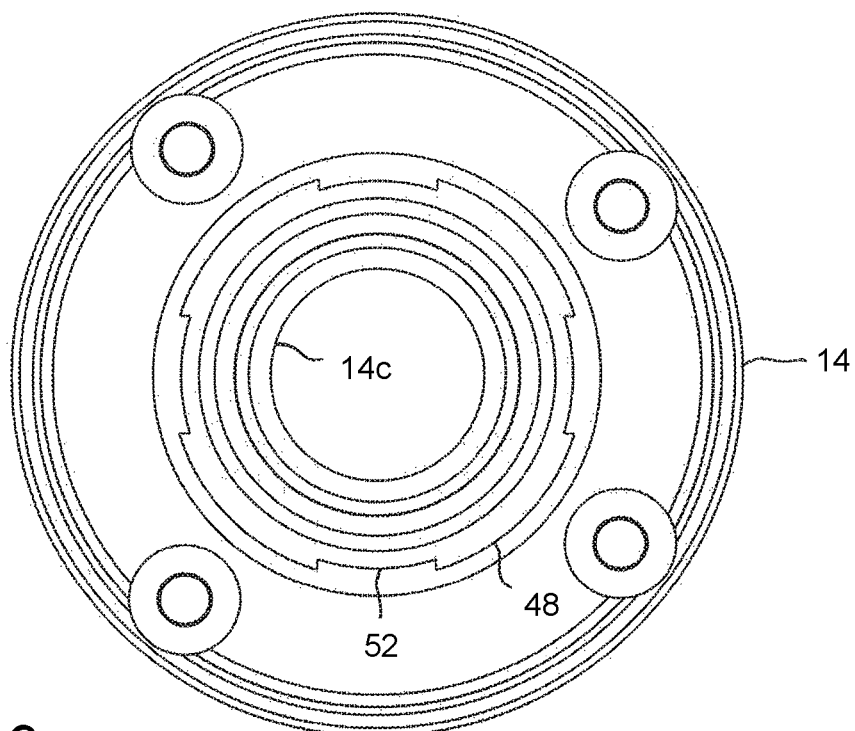
FIG. 9 is a top plan view of the housing.
Figure 10:
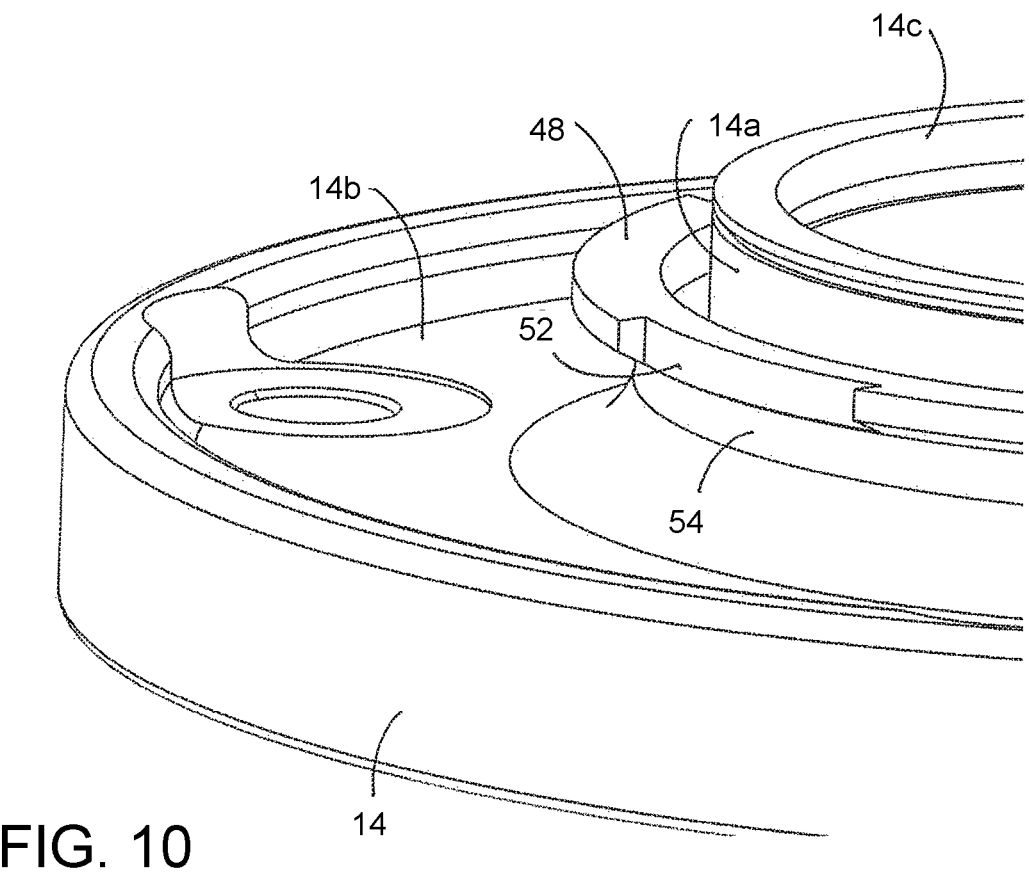
FIG. 10 is an isometric view showing part of the housing.

In the embodiment shown in FIGS. 4-10 the retaining claws 46 and the corresponding cut-out portions 52 are equally spaced and all the same size. In this case the number of different positions of the hub element 22 in which the retaining claws 46 can be aligned with the cut-out portions 52 is equal to the number of retaining claws 46 and cut-out portions 52. For example, in this embodiment there are four equally-spaced, identical claws 46 and four cut-out portions 52, and there are four positions of the hub element 22 in which the claws 46 are correctly aligned with the cut-out portions 52 to allow axial separation of the hub element 22 from the housing 18. There may alternatively be more or fewer claws and cut-out portions. Also, the edges of the claws and cut-out portions do not have to be sharp as shown in FIG. 9: they could be rounded.

Alternatively, the retaining claws 46 and the corresponding cut-out portions 52 may be of unequal size and/or may be unequally spaced. In this case, the number of different positions of the hub element in which the retaining claws 46 can pass through the cut-out portions 52 will be reduced, in some cases to a single unique position. For example, if the hub flange carries two identical claws and a third larger claw, and the retention flange 48 similarly has two identical cut-out portions and one larger cut-out portion 50, there will be only one position in which the claws can pass through the cut-out portions, which will be when the larger claw is aligned with the larger cut-out portion. The same effect can be achieved by spacing the claws unevenly around the hub flange 32 and providing an identical uneven spacing for the cut-out portions, so that the claws can be aligned with the cut-out portions only in a single unique position of the hub element 22.

Optionally, the rotary cutter unit 6 has a modular design and is designed to be replaced as a single unit. If a rotary cutter unit 6 breaks as a result of the cutter disc 7 striking an obstacle, it can be removed by undoing the bolts 16 that attach the rotary cutter unit 6 to the cutter bar 4 and lifting the rotary cutter unit 6 away. A new rotary cutter unit 6 can then be attached to the cutter bar 4 by inserting the lower part of the rotary cutter unit 6 through the hole 9 so that the drive gear 28 engages the drive mechanism within the cutter bar housing, and reattaching the bolts 16. The rotary cutter unit 6 can therefore be replaced in-situ with minimal interruption to the mowing operation.

Figure 7:
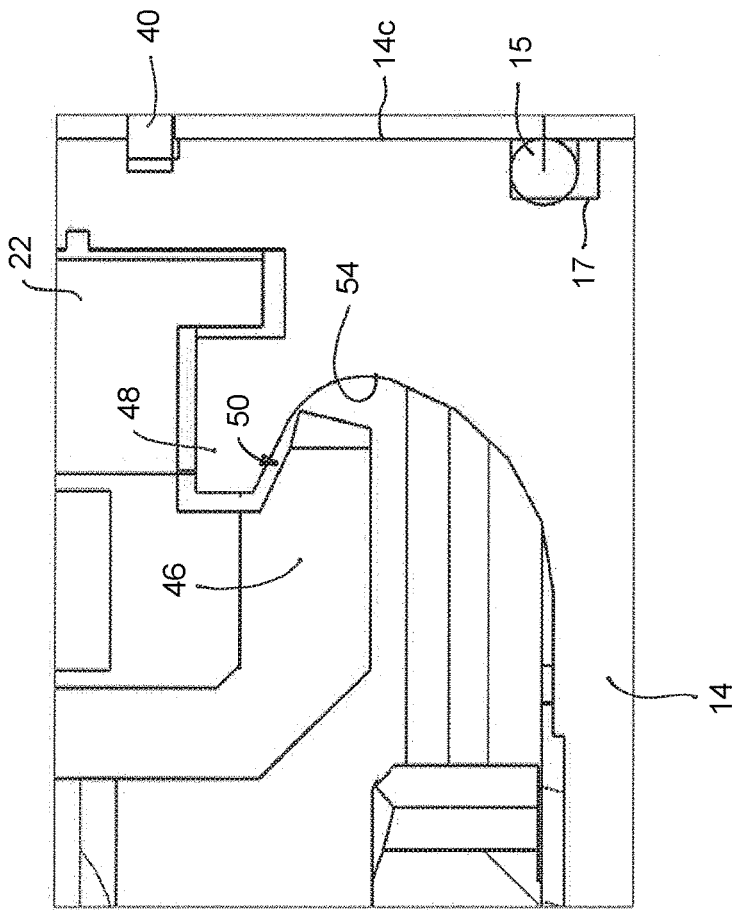
FIG. 7 is an enlarged cross-section showing part of the retention mechanism in the locked configuration.
Figure 11:
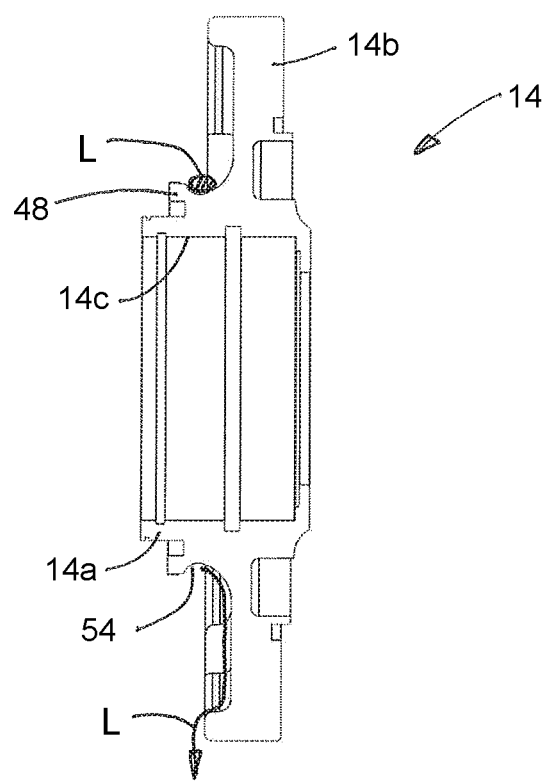
FIG. 11 is a side sectional view of the housing shown in a storage or transportation position.
Figure 12:
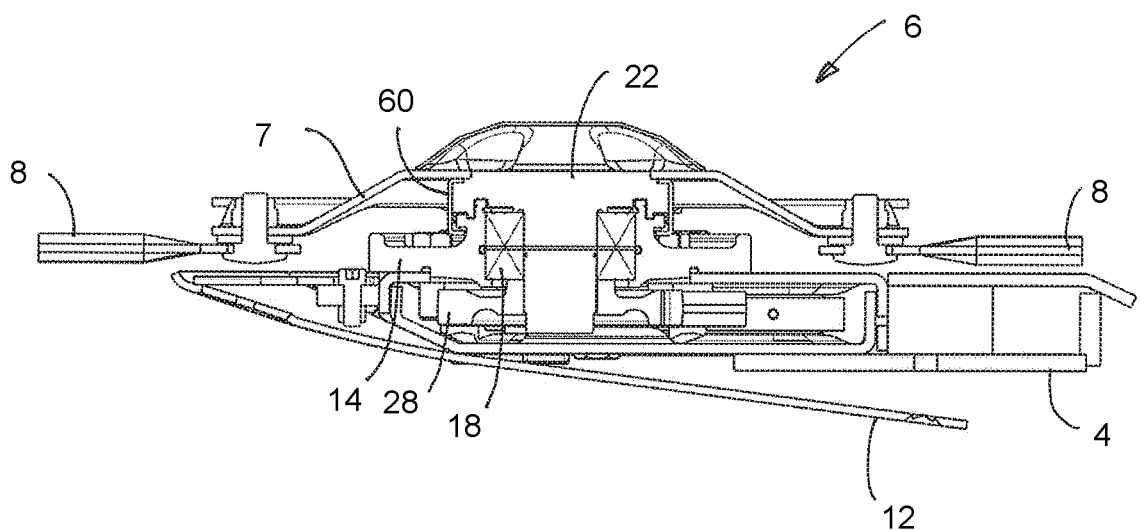
FIG. 12 is a cross-sectional view showing a cutter bar and a second rotary cutter unit, according to a second embodiment of the disclosure.
Figure 13:
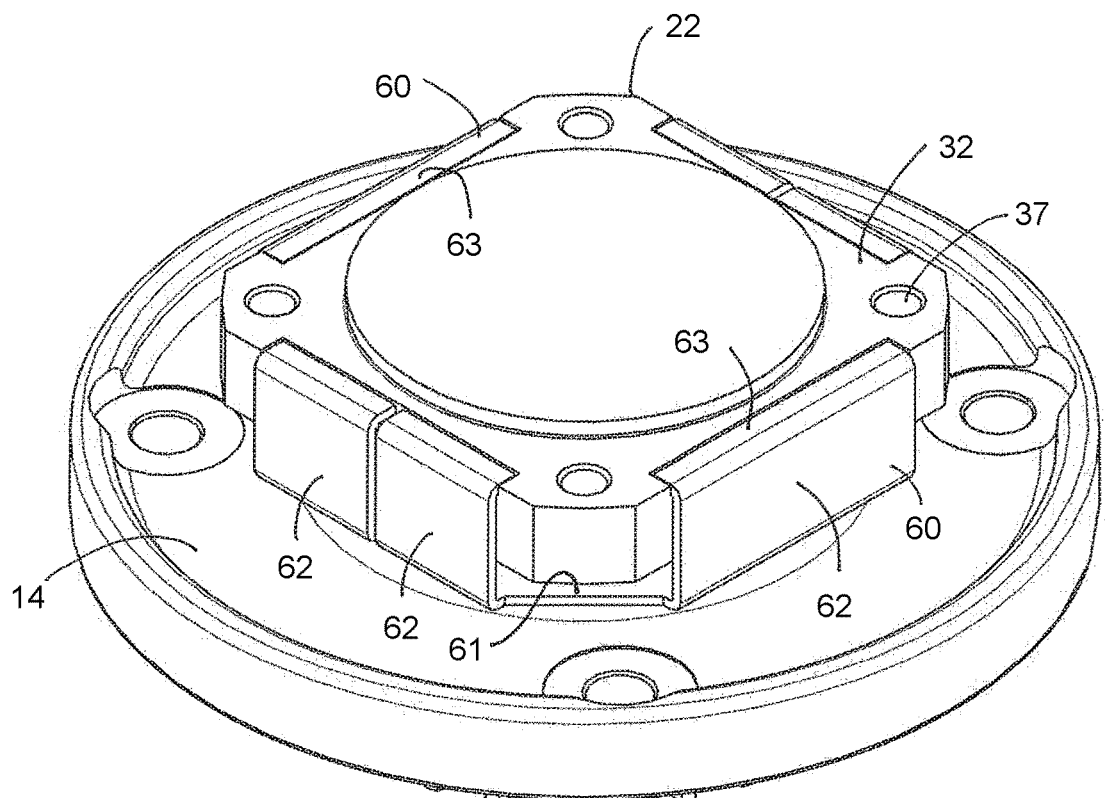
FIG. 13 is an isometric view of a housing and rotor assembly that forms part of the second rotary cutter unit, in a fully assembled condition.
Figure 14:
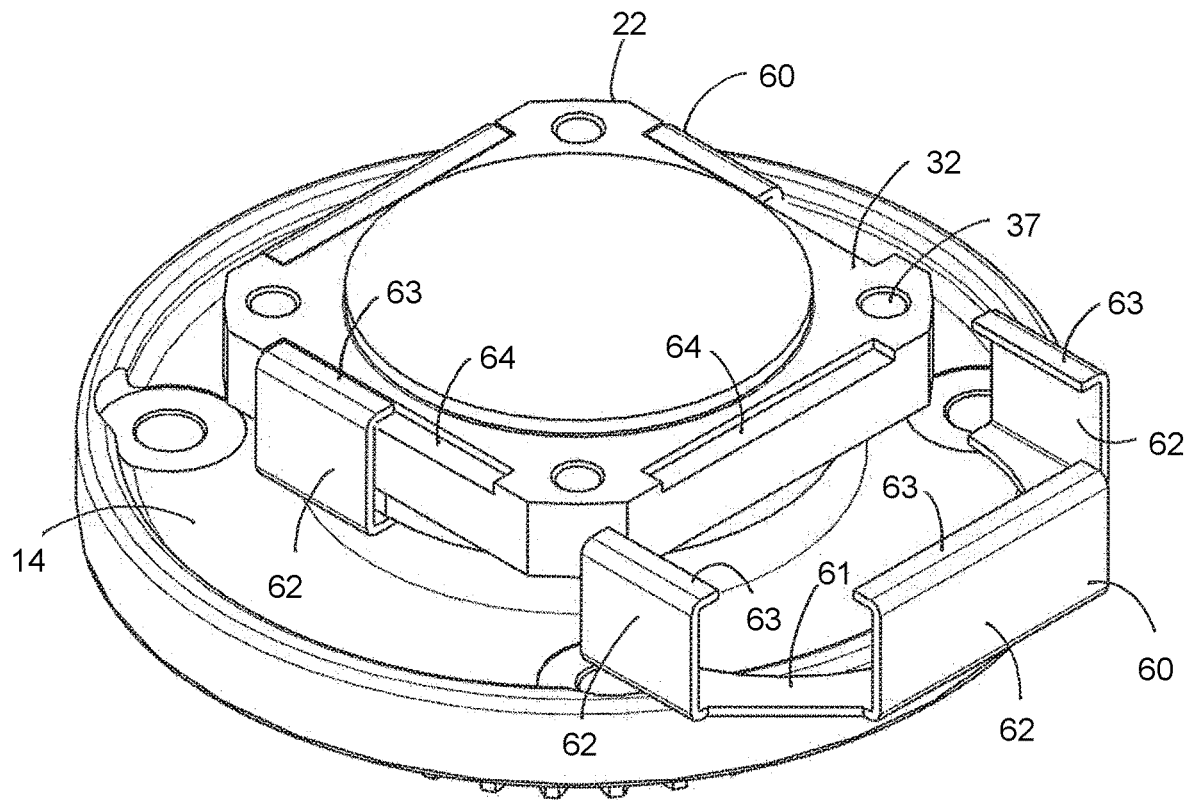
FIG. 14 is an isometric view of the housing and a rotor assembly of the second rotary cutter unit, in a partially assembled condition.
Figure 15:
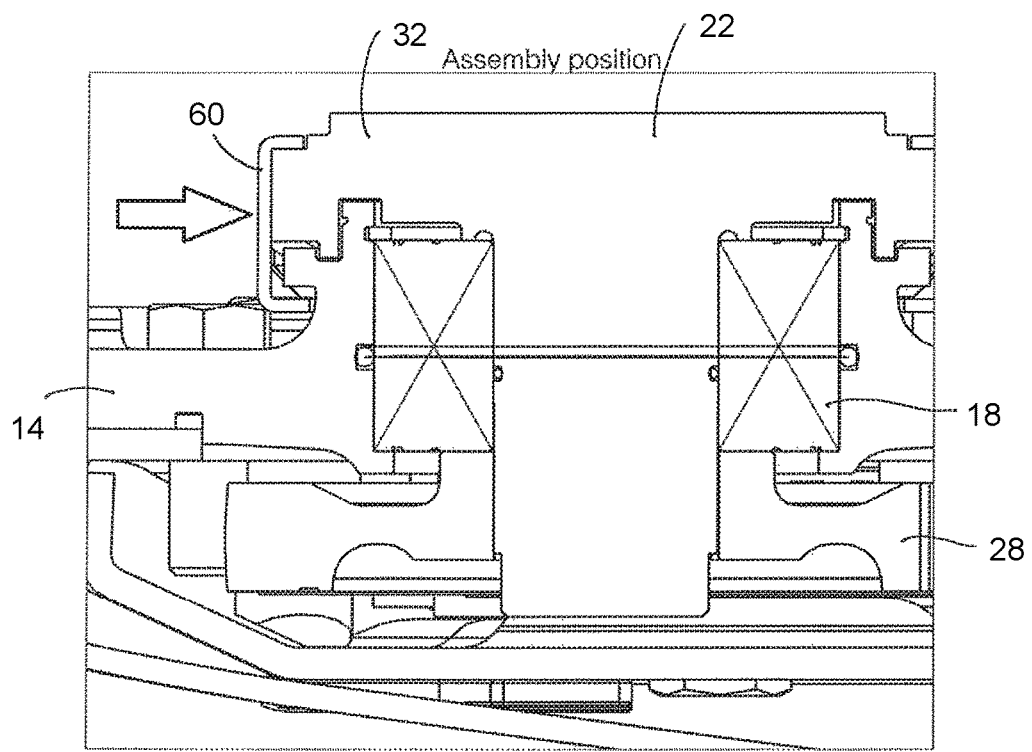
FIG. 15 is an enlarged side sectional view of the second rotary cutter unit.

Referring to FIGS. 7 and 8, it can be seen that the outer surface of the housing 14 has a curved profile providing an approximately U-shaped channel 54 that extends around the circumference of the housing between the fixing flange 14b and the retention flange 48. The channel 54 helps to prevent water/liquids from entering the bearing 18, particularly when the cutter bar 4 is lifted for transportation or storage to an upright position, as shown in FIG. 11. When this happens, any liquid that has collected on the housing (for example, rain, condensation or sap from processed crops) will flow around the channel 54 and then run off the housing at its lowest point. FIG. 11 shows a typical flow path L for liquid flowing off the housing 14 when it is in an upright position. The retention flange 48 prevents the liquid from flowing towards the bore 14c in the housing 14, and so prevents it from entering the bearing 18. This reduces the risk of damage to the bearing if, for example, water enters the bearing and then freezes, potentially destroying the bearing.

FIGS. 12-16 illustrate a second embodiment of the disclosure, in which the rotary cutter unit 6 is similar in many respects to the first rotary cutter unit, as described above. The foregoing description of the first rotary cutter unit therefore applies equally to the second rotary cutter unit, except as indicated below.

Figure 16:
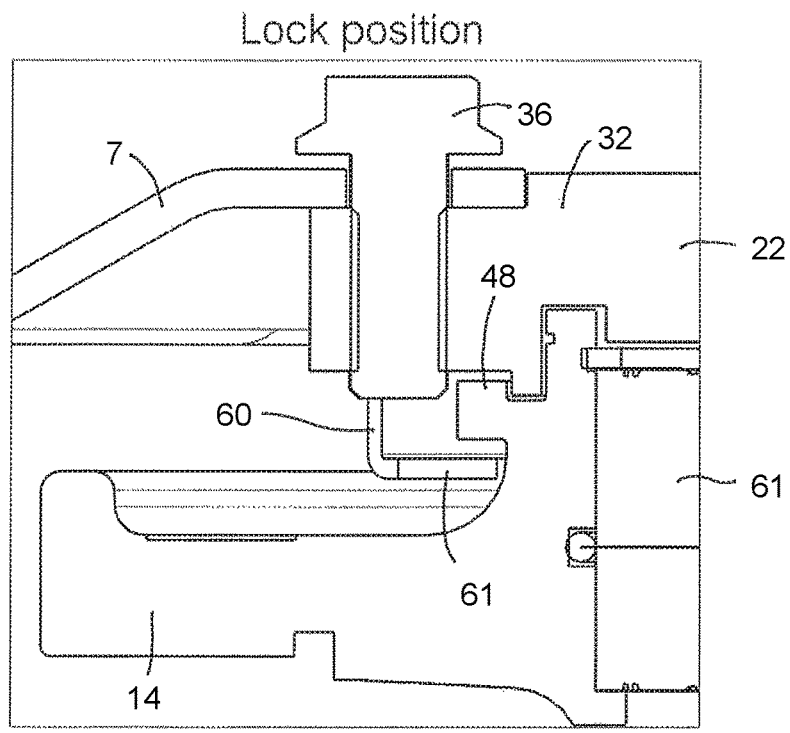
FIG. 16 is an enlarged side sectional view showing part of a retention mechanism of the second rotary cutter unit.

In this embodiment the retention mechanism 44 includes a pair of lock brackets 60 (or detachable retaining elements) that are attached to the hub flange 32. Each lock bracket 60 has a base plate 61 with a semi-circular inner edge, and three clamping members 62 that extend upwards from the base plate 61, each clamping member 62 having an inwards-extending tongue 63 at its upper end. The tongues 63 engage respective recesses 64 around the peripheral edge of the hub flange 32. When the cutter disc 7 is attached to the hub 22 with bolts 36 as shown in FIG. 16, the cutter disc 7 clamps the lock brackets 60 to the hub flange 32, securing them in position.

The semi-circular base plate 61 of each lock bracket 60 extends radially inwards beneath the retaining flange 48, towards the hub shaft 24. If the frangible element 40 breaks (the frangible element being similar to that of the first embodiment), the base plate 61 engages the retention flange 48 to prevent the hub flange 32 and the attached cutter disc 7 separating from the housing 14. Prior to breaking, the lock brackets 60 are spaced from the retention flange 48 so that they do not impede rotation of the rotor assembly 20.

The lock brackets 60 are removably attached to the hub flange 32 and may be removed to permit assembly or disassembly of the rotary cutter unit 6. Therefore, in this embodiment the retaining flange 48 does not require cut-out portions.

In this embodiment the hub flange 32 is approximately square in shape with chamfered corners, and two lock brackets 60 are provided, which engage the recesses 64 on three sides of the hub flange 32. It will be appreciated that the hub flange 32 could have a different shape and different numbers of lock brackets 44 could be provided.

Figure 17:
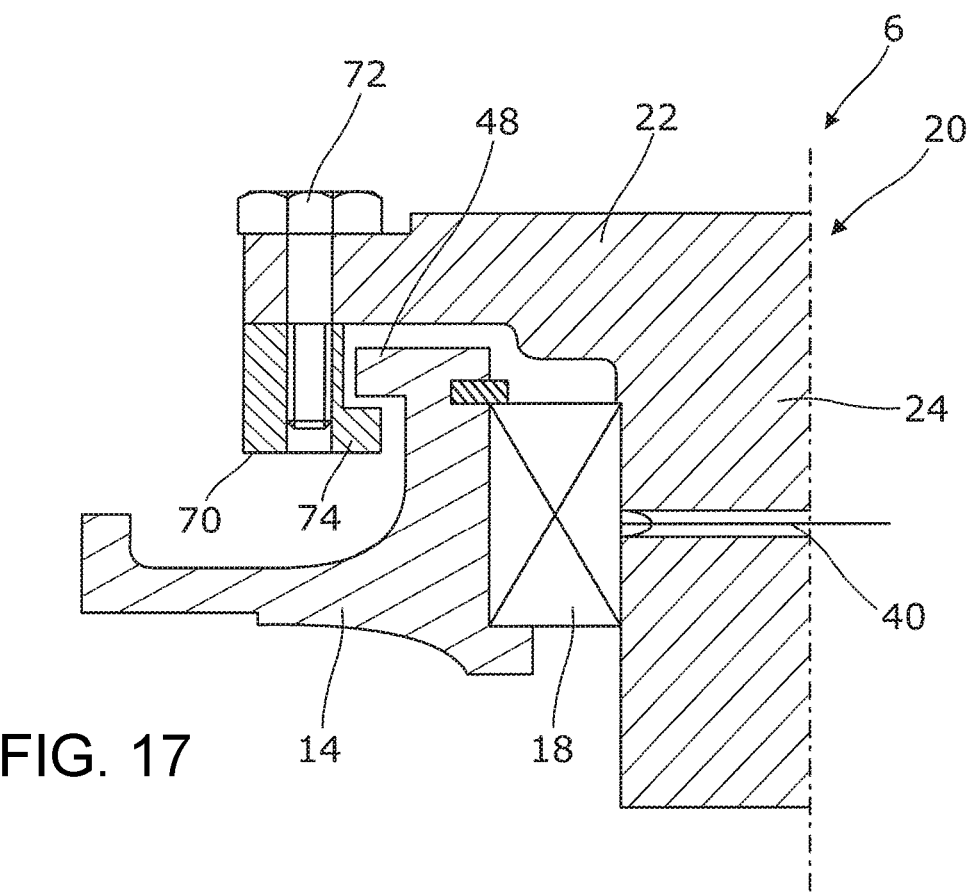
FIG. 17 is a cross-sectional view showing part of a third rotary cutter unit, according to a third embodiment of the disclosure.
Figure 18:
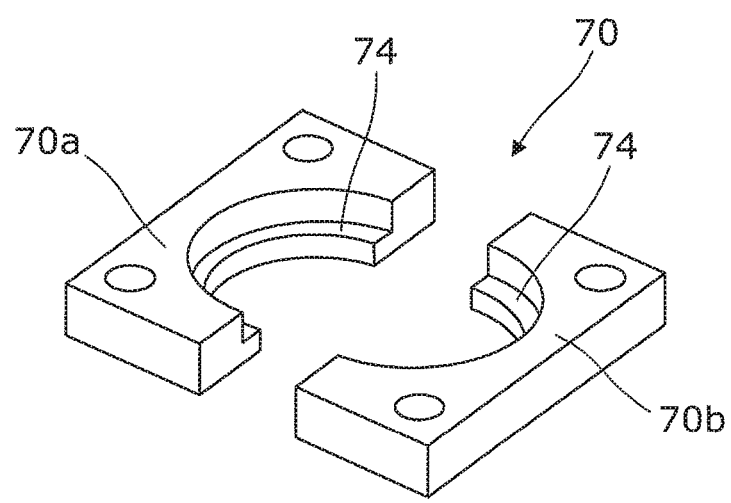
FIG. 18 is an isometric view showing a pair of retention elements that form part of the retention mechanism of the third rotary cutter unit.

A third embodiment of the disclosure is illustrated in FIGS. 17 and 18. Again, the rotary cutter unit 6 is similar in many respects to the rotary cutter unit of the first embodiment, as described above. The foregoing description therefore applies equally to the third embodiment, except as indicated below.

In this embodiment the retaining mechanism includes a ring element 70 that is attached to the underside of the hub flange 32 with bolts 72. The ring element is divided into two ring parts 70a, 70b, which fit together to form a complete ring element when the rotary cutter unit 4 is assembled. The ring element 70 includes an inwardly extending flange 74 at its lower end, which is located beneath the retaining flange 48. If the frangible element 40 breaks (the frangible element again being similar to that of the first embodiment), the ring element flange 74 engages the retaining flange 48 to prevent the hub element 22 separating from the housing 14. Prior to breaking, the ring element is spaced from the retaining flange 48 so that it does not impede rotation of the rotor assembly 20.

The ring element 70 is removably attached to the hub flange 32, for example by bolts 72. The ring element 70 can therefore be removed to permit assembly or disassembly of the rotary cutter unit 6. In this embodiment the ring element 70 comprises two ring parts 70a, 70b. However, it will be understood that the ring element 70 could include a larger number of ring parts.

Figure 19:
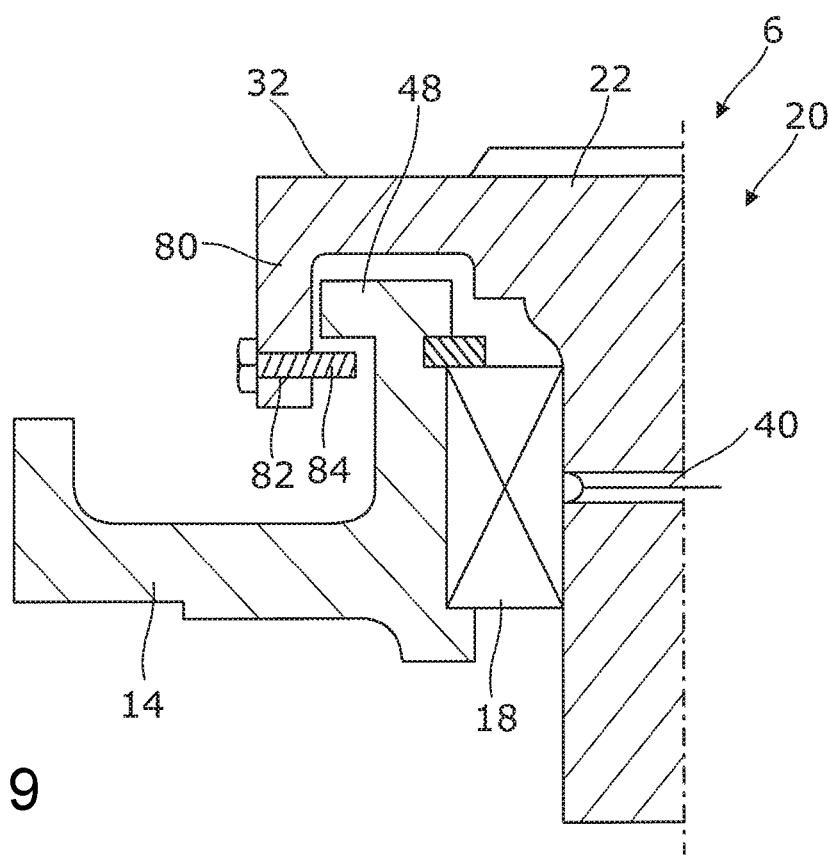
FIG. 19 is a side sectional view showing part of a fourth rotary cutter unit, according to a fourth embodiment of the disclosure.

A fourth embodiment of the disclosure is illustrated in FIG. 19. Again, in this embodiment the rotary cutter unit 6 is similar in many respects to the rotary cutter unit of the first embodiment, as described above. The foregoing description therefore applies equally to the fourth embodiment, except as indicated below.

In this embodiment the hub flange 32 includes a depending sleeve 80 at its outer periphery, which extends downwards beyond the position of the retaining flange 48. A set of threaded holes 82 are provided in the depending sleeve 80, which receive a set of bolts 84. The bolts 84 extend inwards beneath the retaining flange 48 and, if the frangible element 40 breaks, (the frangible element again being similar to that of the first embodiment), the bolts 84 engage the retaining flange 48 to prevent the hub element 22 separating from the housing 14. Prior to breaking, the bolts 84 are spaced from the retaining flange 48 so that they do not impede rotation of the rotor assembly 20.

The bolts 84 can be removed from the holes 82, allowing assembly or disassembly of the rotary cutter unit 6. It will be appreciated that any number of bolts 84 could be provided, although 3 or 4 bolts would be typical.

Figure 20:
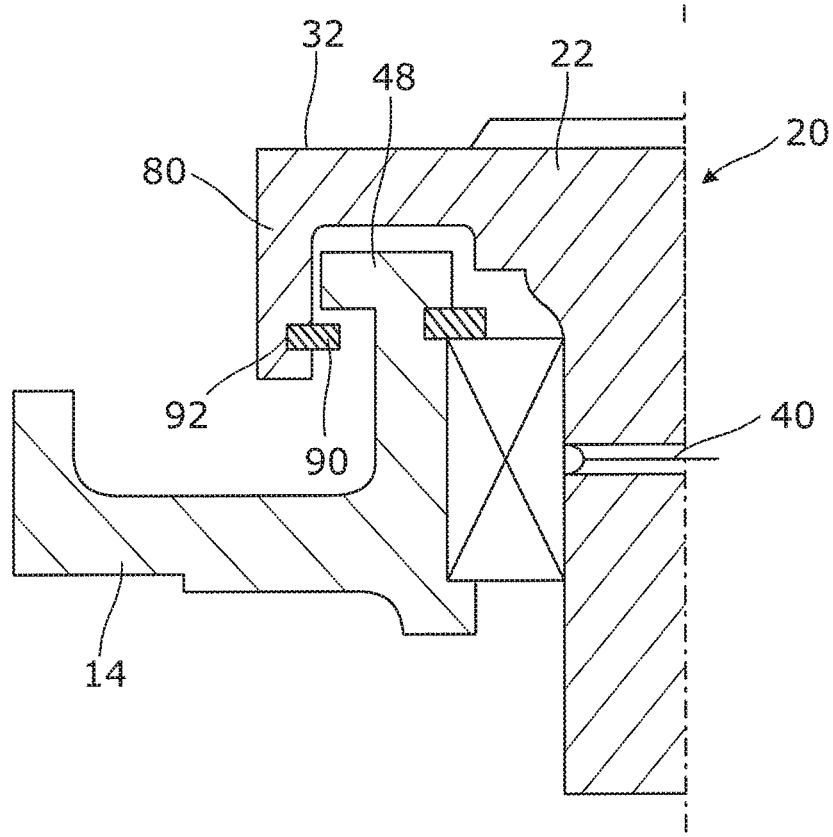
FIG. 20 is a side sectional view showing part of a fifth rotary cutter unit, according to a fifth embodiment of the disclosure.
Figure 26:
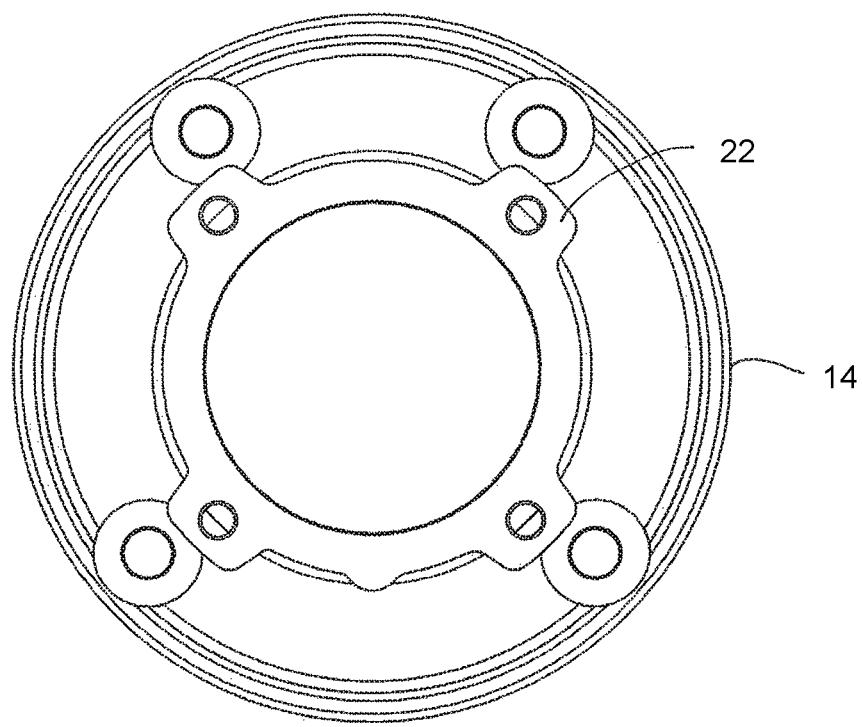
FIG. 26 is a top plan view of a housing and rotor assembly of the sixth rotary cutter unit.
Figure 21:
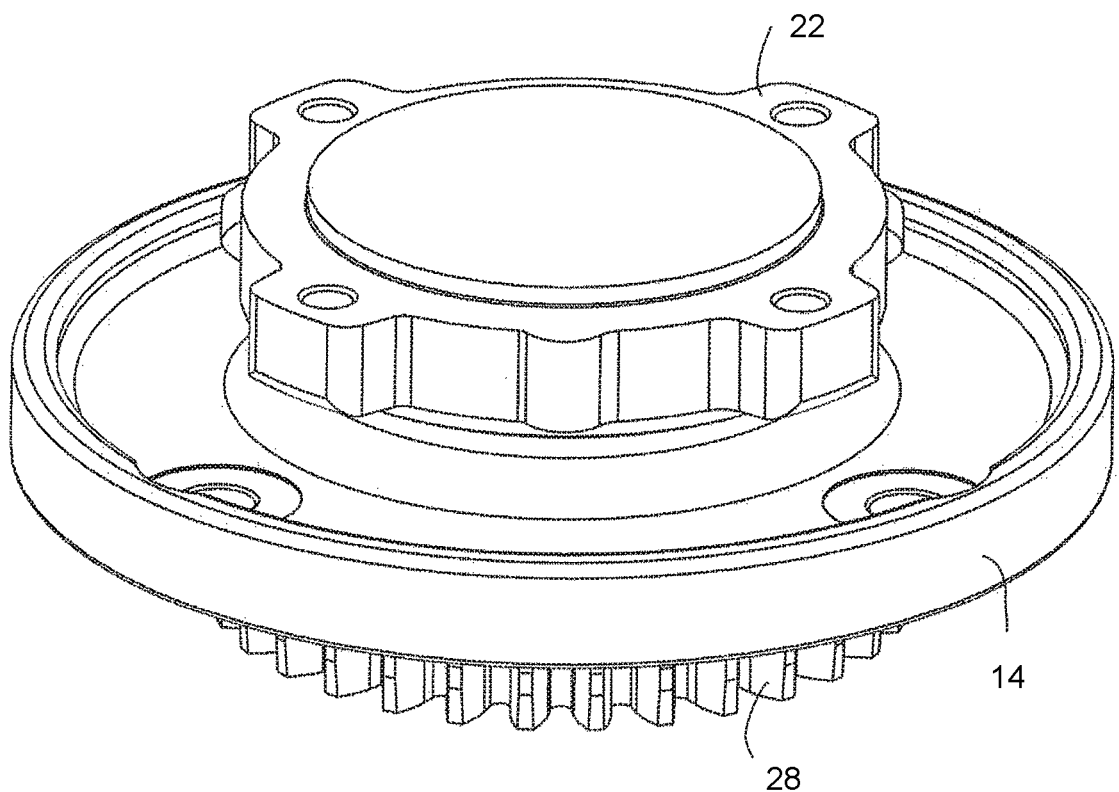
FIG. 21 is an isometric view showing a housing and rotor assembly of a sixth rotary cutter unit, according to a sixth embodiment of the disclosure.
Figure 22:
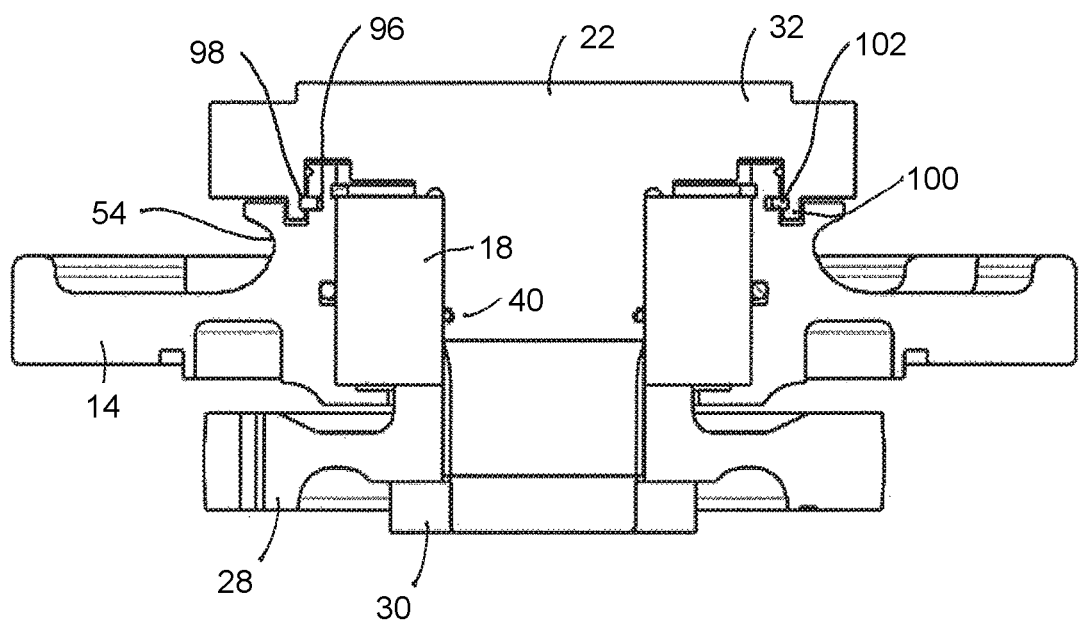
FIG. 22 is a side sectional view of the sixth rotary cutter unit.
Figure 23:
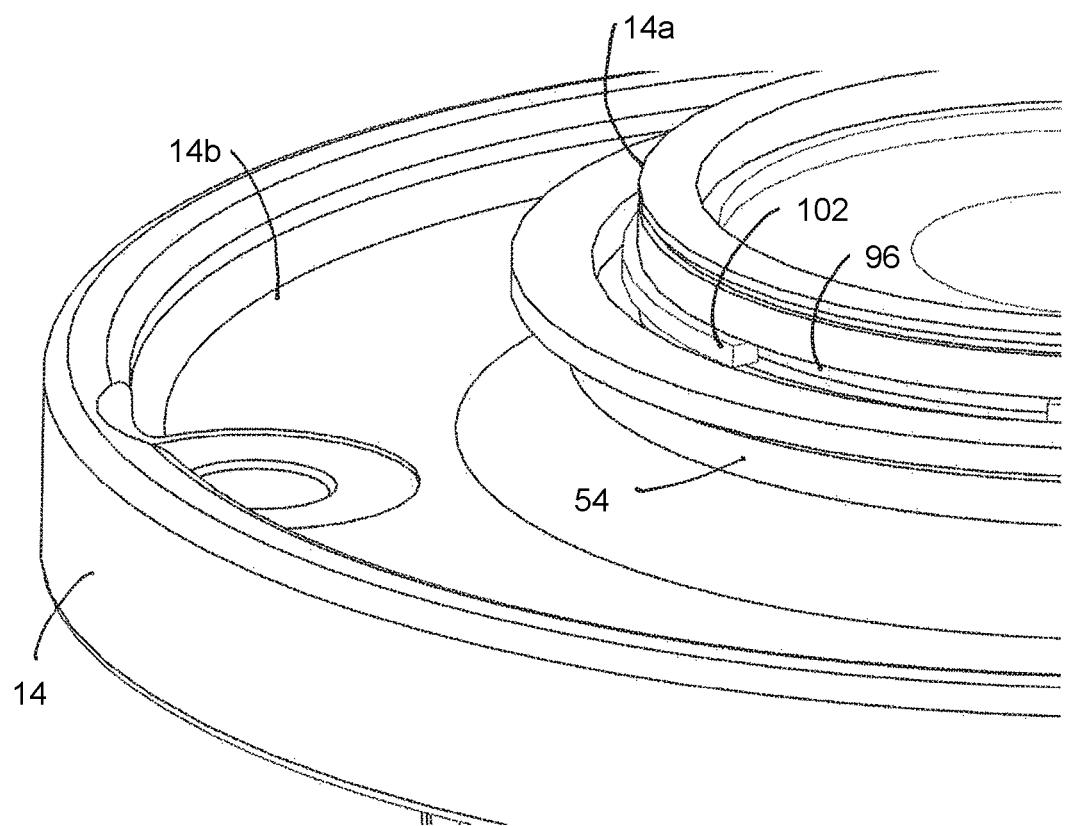
FIG. 23 is an isometric view of a housing component of the sixth rotary cutter unit.
Figure 24:
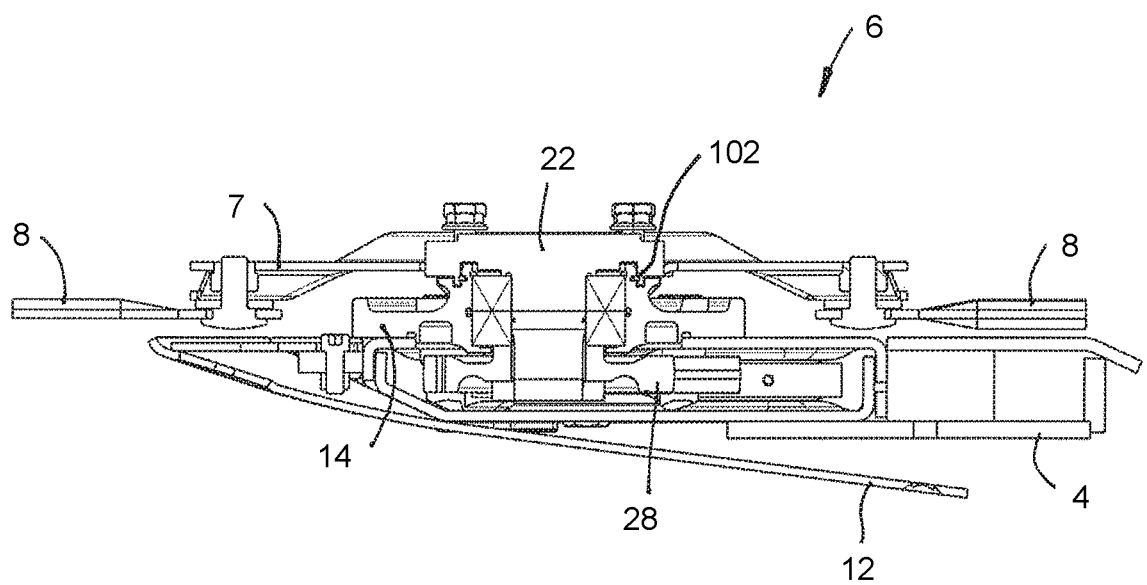
FIG. 24 is a side sectional view of the sixth rotary cutter unit, mounted on a cutter bar.
Figure 25:
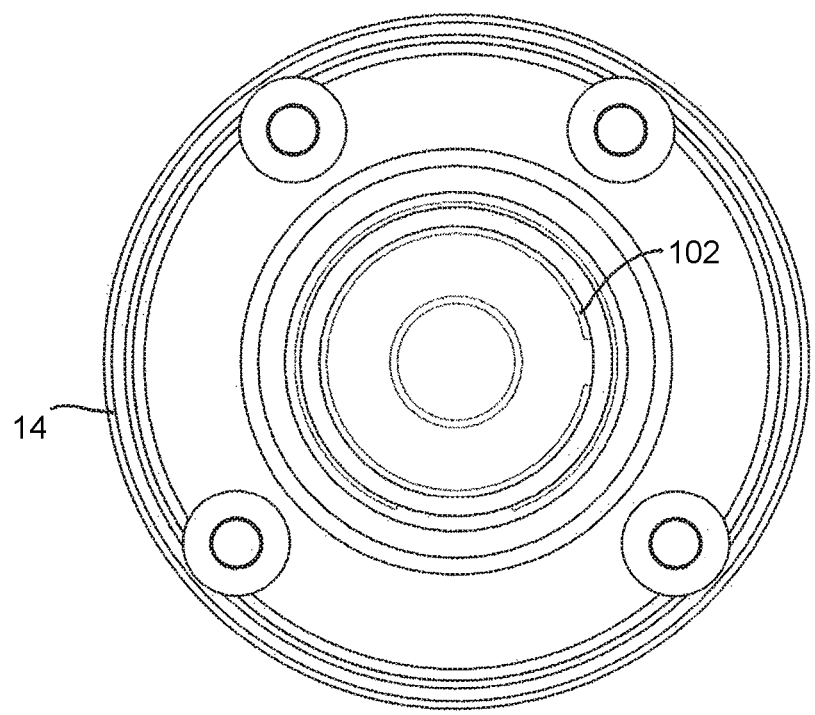
FIG. 25 is a top plan view of the housing of the sixth rotary cutter unit.

FIG. 20 illustrates a fifth embodiment of the disclosure. The rotary cutter unit in this case is very similar to the rotary cutter unit of the fourth embodiment, shown in FIG. 19, and includes a sleeve 80 that depends from the hub flange 32 and extends downwards beyond the retaining flange 48. In this case, instead of bolts 84, the retaining mechanism 44 comprises a circlip 90, or Seeger ring, which is received in an inwards facing slot 92 provided towards the lower end of the sleeve 80. The circlip 90 is made of an elastic material, for example spring steel, and when unloaded it has an outer diameter that is greater than the inner diameter of the slot 92. Therefore, when the circlip 90 is positioned in the slot 92 it is slightly compressed and is retained in the slot 92 by the elastic tension within the ring.

The circlip 90 extends radially inwards from the sleeve 80 and is positioned below the retaining flange 48. If the frangible element 40 breaks (the frangible element being similar to that of the first embodiment), the circlip 90 engages the retaining ring 48 to prevent the hub element 22 separating from the housing 14. Prior to breaking, the circlip 90 is spaced from the retaining flange 48 so that it does not impede rotation of the rotor assembly 20.

A sixth embodiment of the disclosure is illustrated in FIGS. 21 to 26. In this embodiment the rotary cutter unit is very similar to that shown in FIG. 20 and the foregoing description therefore applies, except as indicated below. In this embodiment the housing 14 does not include a retaining flange 48, but instead is provided with an outwards facing slot 96, which is provided in the sleeve portion 14a of the housing 14. A corresponding inwards facing slot 98 is provided in a depending portion 100 of the hub flange 32. A retaining ring 102, for example a circlip or a Seeger ring, is located in the slot 96 in the housing 14. The retaining ring 102 is made of an elastic material, for example spring steel or carbon fibre, and it has an outer diameter that is greater than the diameter of the sleeve portion 14a and an inner diameter that is smaller than the diameter of the sleeve portion 14a. The retaining ring 102 is therefore retained within the slot 96, but extends outwards beyond the surface of the sleeve portion 14a.

The outer part of the retaining ring 102 engages the inwards facing slot 98 in the depending portion 100 of the hub flange 32. Therefore, if the frangible element 40 breaks (the frangible element again being similar to that of the first embodiment), the retaining ring 102 prevents the hub element 22 separating from the housing 14. Prior to breaking, the retaining ring 102 does not impede rotation of the rotary assembly 20, as it is sized to rotate freely with at least one of the inner and outer slots 96, 98.

Optionally (and not illustrated in the drawings), the depending sleeve portion 100 may have a chamfered surface at its lower end, which urges the retaining ring 102 radially inwards when the hub 22 is pressed downwards, thus allowing the depending sleeve portion 100 to ride over the retaining ring 98. When the hub element has been pressed down far enough relative to the housing 14, so that the retaining ring 102 is aligned with the inwards facing slot 98, the retaining ring 102 springs outwards and engages the slot 98 to secure the hub element 22 to the housing 14.

The embodiment illustrated in FIGS. 21 to 26 has the advantage that the retaining ring 102 is entirely enclosed within the inner and outer slots 96, 98 and is therefore inaccessible without the use of specialised tools. This retaining mechanism is therefore particularly suitable for use in rotary cutter units that are not designed to be user serviceable.

The invention claimed is:

1. A rotary cutter unit for an agricultural mower, comprising:
  a housing that carries a rotary bearing having an axis of rotation,
  a rotor assembly that is supported by the bearing for rotation relative to the housing about the axis of rotation, wherein the rotor assembly includes a shaft that extends through the bearing,
  a drive input element at an input end of the shaft for transmitting rotary drive to the shaft,
  a drive output element at an output end of the shaft to receive rotary drive from the shaft,
  a frangible element comprising a weakened portion of the shaft between the drive input element and the drive output element, which is configured to break when subjected to an excessive load so as to interrupt the transmission of rotary drive between the drive input element and the drive output element, and
  a retention mechanism that prevents separation of the drive output element from the housing when the frangible element breaks but permits rotation of the drive output element relative to the housing;
  wherein the retention mechanism includes a retention element that extends substantially radially between the drive output element and the housing to restrict axial movement between the drive output element and the housing.

2. The rotary cutter unit according to claim 1, wherein the retention mechanism includes an outwardly extending radial flange on the housing and at least one inwardly extending retention element on the drive output element that engages the radial flange to prevent axial separation of the drive output element from the housing.

3. The rotary cutter unit according to claim 2, wherein the housing includes a sleeve element that extends axially around a portion of the drive shaft, and wherein the radial flange is provided towards one end of the sleeve, adjacent the drive output element.

4. The rotary cutter unit according to claim 2, wherein the drive output element includes a plurality of inwardly extending claws that engage the radial flange.

5. The rotary cutter unit according to claim 4, wherein the radial flange includes a plurality of openings through which the claws can pass to permit axial displacement of the drive output element relative to the housing.

6. The rotary cutter unit according to claim 2, wherein the drive output element includes a plurality of detachable retaining elements that engage the radial flange.

7. The rotary cutter unit according to claim 6, wherein the detachable retaining elements comprise brackets that are removably attached to the drive output element, each bracket including an inwardly extending retention element that engages the radial flange.

8. The rotary cutter unit according to claim 6, wherein the detachable retaining elements comprise a plurality of ring components that are removably attached to the drive output element to form an inwardly extending ring that engages the radial flange.

9. The rotary cutter unit according to claim 6, wherein the detachable retaining elements comprise a plurality of fasteners that are inserted through radial holes in the drive output element and extend radially inwards to engage the radial flange.

10. The rotary cutter unit according to claim 2, wherein the inwardly extending retention element comprises a circlip that is located in an inwards-facing slot in the drive output element and engages the radial flange to prevent axial separation of the drive output element from the housing.

11. The rotary cutter unit according to claim 1, wherein the retention mechanism includes an outwardly extending retention element on the housing that engages the drive output element to prevent axial separation of the drive output element from the housing when the frangible element breaks.

12. The rotary cutter unit according to claim 11, wherein the outwardly extending retention element comprises a circlip that is located in an outwards-facing slot in the housing and engages an inwards-facing slot in the drive output element.

13. The rotary cutter unit according to claim 12, wherein the housing includes an inner sleeve element that extends around a portion of the drive shaft, and the drive output element includes an outer sleeve element that overlaps a portion of the inner sleeve element, and wherein the circlip engages the overlapping portions of the inner and outer sleeve elements.

14. The rotary cutter unit according to claim 1, wherein the drive input element comprises a gear.

15. The rotary cutter unit according to claim 1, wherein the drive output element comprises or is attached to a rotary cutter assembly that includes a plurality of cutter knives.

16. A cutter bar for an agricultural mower, the cutter bar comprising:
  a support structure,
  a plurality of rotary cutter units according to claim 1, each rotary cutter unit being mounted on the support structure, and
  a drive mechanism that drives the drive input element of each rotary cutter unit.

17. The cutter bar according to claim 16, wherein the support structure comprises an enclosed carrying beam, wherein the drive mechanism is housed within the enclosed carrying beam, and wherein the housing of each rotary cutter unit is mounted on the carrying beam such that the shaft extends through an aperture in the carrying beam, the drive input element of each rotary cutter unit is located internally of the carrying beam in engagement with the drive mechanism, and the drive output element of each rotary cutter unit is located externally of the carrying beam.

18. An agricultural mower comprising the cutter bar according to claim 17 and a vehicle that supports the cutter bar.

19. A rotary cutter unit for an agricultural mower, comprising:
- a housing that carries a rotary bearing having an axis of rotation,
- a rotor assembly that is supported by the bearing for rotation relative to the housing about the axis of rotation, wherein the rotor assembly includes a shaft that extends through the bearing,
- a drive input element at an input end of the shaft for transmitting rotary drive to the shaft,
- a drive output element at an output end of the shaft to receive rotary drive from the shaft,
- a frangible element comprising a weakened portion of the shaft between the drive input element and the drive output element, which is configured to break when subjected to an excessive load so as to interrupt the transmission of rotary drive between the drive input element and the drive output element, and
- a retention mechanism that prevents separation of the drive output element from the housing when the frangible element breaks but permits rotation of the drive output element relative to the housing;
- wherein the retention mechanism includes an outwardly extending radial flange on the housing and at least one inwardly extending retention element on the drive output element that extends substantially radially between the drive output element and the housing and engages the radial flange to prevent axial separation of the drive output element from the housing.

20. A rotary cutter unit for an agricultural mower, comprising:
- a housing that carries a rotary bearing having an axis of rotation,
- a rotor assembly that is supported by the bearing for rotation relative to the housing about the axis of rotation, wherein the rotor assembly includes a shaft that extends through the bearing,
- a drive input element at an input end of the shaft for transmitting rotary drive to the shaft,
- a drive output element at an output end of the shaft to receive rotary drive from the shaft,
- a frangible element comprising a weakened portion of the shaft between the drive input element and the drive output element, which is configured to break when subjected to an excessive load so as to interrupt the transmission of rotary drive between the drive input element and the drive output element, and
- a retention mechanism that prevents separation of the drive output element from the housing when the frangible element breaks but permits rotation of the drive output element relative to the housing;
- wherein the retention mechanism includes an outwardly extending retention element on the housing that extends substantially radially between the drive output element and the housing and engages the drive output element to prevent axial separation of the drive output element from the housing when the frangible element breaks, wherein the outwardly extending retention element comprises a circlip that is located in an outwards-facing slot in the housing and engages an inwards-facing slot in the drive output element.

* * * * *

UNITED STATES PATENT AND TRADEMARK OFFICE
CERTIFICATE OF CORRECTION

PATENT NO. : 10,624,267 B2
APPLICATION NO. : 15/744727
DATED : April 21, 2020
INVENTOR(S) : Thomas Havers Page 1 of 1

It is certified that error appears in the above-identified patent and that said Letters Patent is hereby corrected as shown below:

On the Title Page

In Column 1, below "Item (65)" insert --(30) Foreign Application Priority Data
Jul. 20, 2015 (EP) 15177479--.

In the Specification

In Column 1, Line 9, delete "U.K." and insert --EP--.

Signed and Sealed this
Eighth Day of September, 2020

Andrei Iancu
*Director of the United States Patent and Trademark Office*